April 25, 1967    J. W. HOLLOWAY    3,315,970
FLEXIBLE GASKET FOR HIGH AND LOW PRESSURE PIPE JOINTS
Filed Feb. 8, 1965    2 Sheets-Sheet 1
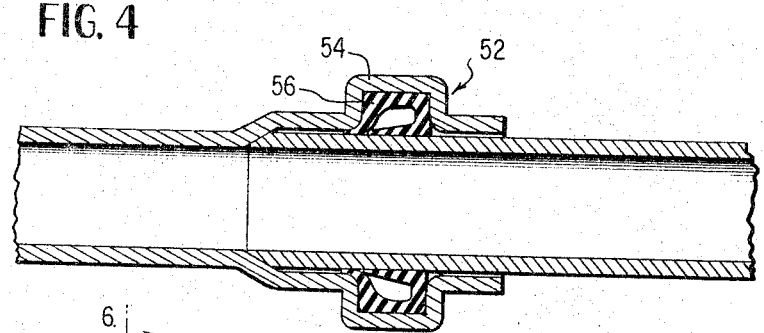
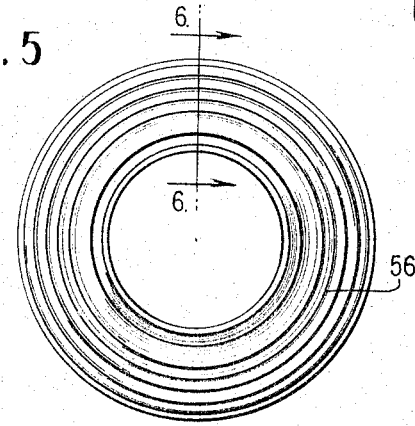
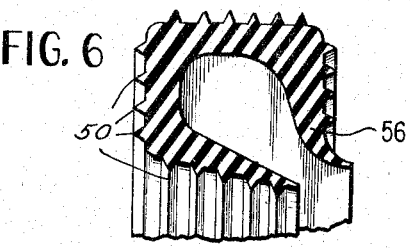
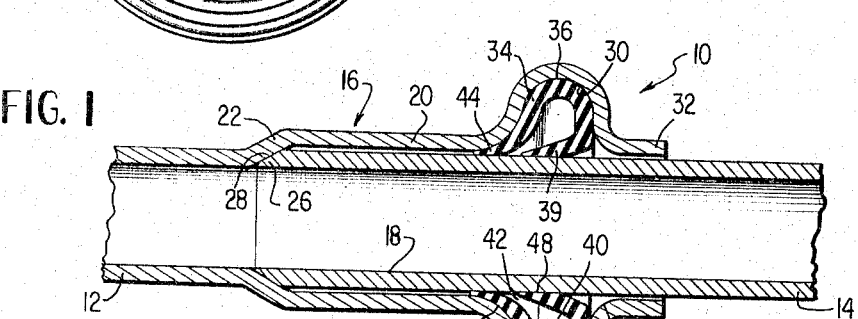
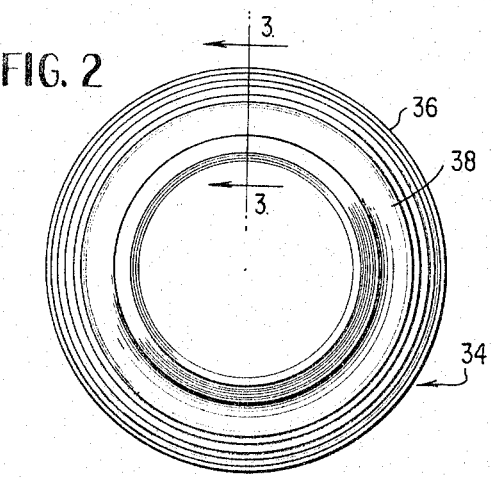
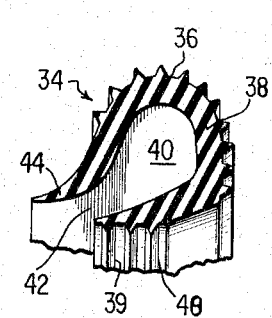
INVENTOR.
JOHN W. HOLLOWAY
BY    ATTORNEYS.

April 25, 1967 J. W. HOLLOWAY 3,315,970
FLEXIBLE GASKET FOR HIGH AND LOW PRESSURE PIPE JOINTS
Filed Feb. 8, 1965 2 Sheets-Sheet 2

INVENTOR.
JOHN W. HOLLOWAY
BY LeBlanc and Shur
ATTORNEYS.

United States Patent Office 3,315,970
Patented Apr. 25, 1967

3,315,970
FLEXIBLE GASKET FOR HIGH AND LOW
PRESSURE PIPE JOINTS
John W. Holloway, 1860 NE. 53rd St.,
Fort Lauderdale, Fla. 33308
Filed Feb. 8, 1965, Ser. No. 431,090
4 Claims. (Cl. 277—205)

This invention relates to an improved sealing gasket for use in forming a remarkably simple yet amazingly effective pipe joint, and to the improved pipe joint formed thereby. More particularly, this invention relates to an improved sealing gasket that is adapted to be positioned between the tightly telescoped ends of two polyvinyl chloride (PVC) pipes, thereby forming, without more, an inexpensive pipe joint having increased reliability over present PVC pipe joints.

In the past, sealing rings or gaskets have been used to seal pipe joints formed by telescoping the ends of pipe together. Moreover, such gaskets have also included a split or opening therein which permitted the pressurized fluid flowing in the pipes to communicate with the hollow interior of the gaskets and thereby expand the gaskets against the pipes so that the effectiveness of the seal was increased as the pressure of the fluid increased. However, this type of sealing gasket has been found to have a serious disadvantage in that it permits the pipes to drain at the joints when the pressure of the fluid in the pipes is reduced. For that reason such gaskets are presently used only with portable irrigation pipes or the like where drainage is not a problem and in fact, is actually desirable to facilitate rapid movement of these pipes. Therefore, for permanent installations, industry has been forced to rely on various other types of sealing gaskets or joints which do not require such sealing gaskets.

Thus, it has long been the standard practice in the industry to inter-connect two PVC pipes in end to end relationship, for a permanent installation by using solvent cements, or by forming mated threaded portions on the ends of the pipes. While these two prior methods of connecting PVC pipes are used extensively today, it is primarily because of the fact that there has been no commercially acceptable substitute and it has long been recognized that these methods appreciably increase the cost of the PVC piping. Other disadvantages of PVC pipe joints formed by these two methods are that in many cases the joints are the weakest part of the PVC piping system and that if the completed pipe joint is found to leak or to be otherwise faulty, the defective joint must be cut out of the piping and an entirely new joint formed, thereby substantially increasing the cost of such piping system.

Accordingly, it is the primary object of this invention to provide an improved sealing gasket which when positioned between the tightly telescoped ends of two pipes, affords a pipe joint that is completely leak-proof, regardless of whether the fluid flowing in the pipes is under pressure or not. A related object of this invention is to provide a leak-proof pipe joint which may be utilized in various applications from low pressure drainage, waste and vent systems to high pressure industrial systems.

Another object of this invention is to provide an improved sealing gasket for use in a pipe joint, characterized in that its effectiveness as a seal is increased as the pressure of the fluid flowing in the pipes increases, and in that it also includes a curled tip which is compressed between the pipes to be particularly effective to prevent leakage when the fluid flowing in the pipes is not under pressure. A related object of this invention is to provide an improved sealing gasket which also includes a bottom flap portion that is arranged to tightly bear against the outer diameter of the inner telescoped pipe to aid further the sealing effectiveness, particularly in low pressure applications.

Another object of this invention is to provide an improved, high strength pipe joint which may be quickly and easily assembled and which permits the pipes to linearly expand and contract without disturbing the joint. A related object of this invention is to provide an improved telescoped joint for PVC pipes wherein the outer telescoped pipe overlaps the inner pipes a distance substantially equal to about three times the normal outside diameter of the pipes.

Another object of this invention is to provide an improved pipe joint in which two pipes, preferably PVC pipes, are tightly telescoped together with the outer pipe having a recess formed therein for the reception of the improved sealing gasket of this invention. A related object of this invention is to provide an improved pipe joint wherein the body of the improved sealing gasket is molded to the exact dimensions of the recess formed in the outer pipe and includes a plurality of V shaped ridges formed on the outer surface of the gasket so that when the gasket is positioned within the recess between the pipes, these ridges are tightly compressed and thus give added sealing strength to the gasket, particularly in low pressure applications.

Still other objects and advantages of the present invention will be apparent from the following description thereof, with reference to the accompanying drawings, in which:

FIGURE 1 is a vertical cross-sectional view of the improved pipe joint of this invention in which an improved sealing gasket of this invention is shown positioned between the telescoped ends of two pipes.

FIGURE 2 is a plan view of the improved sealing gasket shown in FIGURE 1, as it appears when not compressed.

FIGURE 3 is a vertical cross-sectional view taken on line 3—3 of FIGURE 2.

FIGURE 4 is a vertical cross-sectional view of the improved pipe joint similar to FIGURE 1 and utilizing a sealing gasket having a modified cross-sectional shape.

FIGURE 5 is a plan view of the improved sealing gasket shown in FIGURE 4 as it appears when not compressed.

FIGURE 6 is a vertical cross-sectional view taken on line 6—6 of FIGURE 5.

Figure 7:
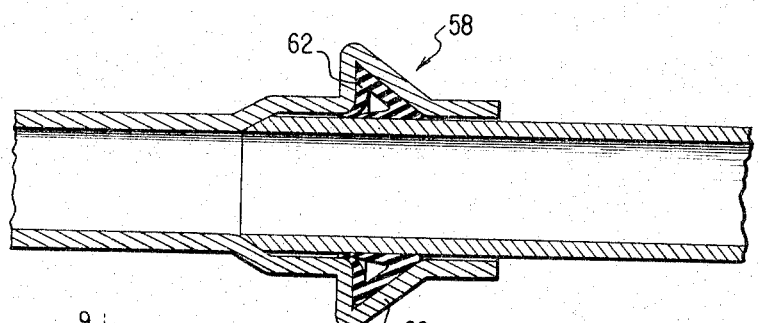
FIGURE 7 is a vertical cross-sectional view of the improved pipe joint similar to FIGURES 1 and 4 and embodying a sealing gasket having a further modified cross-sectional shape.

Referring now to the drawings and more particularly to FIGURE 1, an improved pipe joint of this invention is shown generally at 10. This joint 10 is formed between the cylindrical pipes 12 and 14 by telescoping their end portions 16 and 18, respectively, together so that the end portion 16 of pipe 12 overlaps the end portion 18 of pipe 14.

As is apparent from FIGURE 1, the end portion 16 of the pipe 12 has an enlarged hub 20 formed thereon that receives therein the end portion 18 of pipe 14. The hub 20 is an integral part of the pipe 12 and is connected thereto by the curved portion 22. The hub may be formed by various methods such as, for example, by heating the end 16 and forming the hub on a mandrel. The inner diameter of the hub is only slightly larger than the outer diameter of the pipe 14 and because of this tight clearance, lubrication is normally required to insert the end portion 18 within the hub 20.

The end portion 18 of the pipe 14 has the same diameter as the remainder of the pipe 14 and its leading edge 26 is beveled outwardly at 28 such that, as shown in FIGURE 1, the edge and the curved portion 22 have substantially the same angle. Thus, when the pipes are telescoped together, the edge may be positioned closely adjacent the curved portion 22 whereby the flow path through the pipes 12 and 14 is smooth and substantially uninterrupted.

The hub 20 also has an annular recess 30 integrally formed therein close to the leading edge 32 of the pipe 12. As seen in FIGURE 1, the recess 30 provides a space between the pipe 14 and the hub 20 for the reception of the improved sealing ring or gasket 34 of this invention.

The cross-sectional shape of the inner surface of said recess 30 may be generally described as bell-shaped although clearly it is not exactly symmetrical about any line perpendicular to the longitudinal axis of the pipes. More specifically, its shape may be described with reference to its component curved portions, namely the S shaped curved portion 31 adjacent the leading edge 32, a second S curved portion 33 connecting the recess with the remainder of the hub and contiguous circular segment 35 interconnecting the portions 31 and 33. The curved portions 31 and 33 are not identical and as seen from FIGURE 1, the curved portion 31 is considerably more compact and steeper than the curved portion 33.

The sealing gasket 34 is generally annular in shape, as seen from FIGURE 2, and is made of composition rubber or neoprene. As mentioned above, the sealing gasket fits snugly within the recess 30, as shown in FIGURE 1, as its outer radial surface 36 is formed generally congruent with the inner surface 37 of the recess 30, or in other words the radially outward surface 36 has substantially the same shape and dimensions as the inside surface 37 of the recess 30 and for this reason may also be generally described as bell-shaped. However, as shown in FIGURE 1, while the surface 36 follows the inside curved surface 37 of the recess precisely though the curved portions 33 and 35, the surface 36 does not completely follow the surface 37 through the portion 31 but rather extends radially inwardly therefrom along a line perpendicular to the longitudinal axis of the pipes for a short distance and then continues to extend radially inwardly away from the edge 32 at an acute angle to the above mentioned perpendicular line until it merges with the base portion 39 described hereinafter.

Referring now to FIGURES 2 and 3, the improved sealing gasket 34 comprises an annular body 38 having a hollow center portion 40 which communicates with the outside of the gasket through the annular split or opening 42. When the gasket is positioned within the recess 30, this split 42 is adjacent the end of the recess away from the leading edge 32 of the pipe 12. Thus, when the pressure of the fluid flowing in the pipes 12 and 14 is high, and the fluid forces its way between the hub 20 and the end portion 18, the split 42 permits this pressurized fluid to communicate with the center portion 40 of the gasket thereby causing the body 38 of the gasket to expand like a balloon or inner tube, and such an expansion of the gasket causes the gasket to form a better, tighter seal between the hub 20 and the pipe 14. Therefore, it is apparent that the higher the pressure of the fluid flowing in the pipes 12 and 14, the tighter the seal between the pipes becomes.

In addition to having excellent high pressure sealing characteristics, the gasket 34 has an annular, tapered, curled tip formed on the body 38 to aid in the formation of a low pressure seal. The tip 44 is arranged so that it defines the upper portion of the split 42 and, like the split 42, is directed away from the leading edge 32 of the pipe 12. When the gasket is properly positioned within the recess 30, the tip 44 is clamped or pinched between the hub 20 and the end portion 18 of pipe 14, thereby substantially eliminating leakage past this tip 44, particularly during low pressure applications.

The gasket 38 also includes a base portion 39 which is integrally connected to the body 38 and which is tightly biased into sealing engagement with the outer surface of the pipe 14, as shown in FIGURE 1. The bias results from the fact that when the sealing gasket 34 is unconfined, as shown in FIGURE 2, the base portion 39 extends radially inwardly from the position it is forced to assume when the gasket is confined between the telescoped ends of the pipes 12 and 14, as shown in FIGURE 1. Thus, when the gasket is confined in a pipe joint, the base portion 39, due to the internal resiliency of the material used to make the gasket continuously tries to return to its unconfined position.

As shown in FIGURES 2 and 3, the radially inwardly directed surface 48 of the base portion 39 and preferably the surface 36, include a plurality of integral V-shaped ridges 50 that completely encircle the gasket 34. As mentioned above the body 38 is molded so that its dimensions are exactly those of the space formed between the recess 30 and the pipe 14 and therefore when the ridges 50 are formed on the body 38, the overall dimensions of the gasket are slightly larger than this space. Thus, as in FIGURE 1, when the gasket is positioned in the completed joint, the gasket is actually compressed between the hub and pipe 14 and this compressive force provides extra sealing strength to provide satisfactory service at low or no pressure operations.

As noted above, the joints shown in FIGURES 4, 7 and 10 are basically similar to the joint 10 shown in FIGURE 1 and described hereinabove. In fact the only differences between the joints shown in FIGURES 4, 7 and 10 and the joint 10 resides in the shape of the recesses and of course in the corresponding shape of the sealing gaskets used therein, each gasket being molded so that its shape is substantially congruent with that of the recess. Thus, the sealing gaskets shown in FIGURES 5, 6, 8, 9, 11 and 12 incorporate all the features of the gasket 34 described hereinabove, namely, a curled tip that is compressed between the hub and the inner pipe for low pressure sealing; a base portion which is biased into engagement with the inner pipe, also for low pressure sealing; a hollow center and split or opening communicating therewith which increases the sealing effectiveness of the gasket as the pressure of the fluid increases and a plurality of V-shaped ridges molded on the outer surface of the gasket to increase the overall effectiveness of the gasket.

Therefore, for this reason, an extended description of the pipe joints shown in FIGURES 4–12 is not thought to be necessary and the description thereof will be limited to the specific shape of the recess and sealing gasket utilized therein.

In FIGURE 4, joint 52 has an annular recess 54 which is generally rectangular in cross-sectional shape and the annular sealing gasket 56 is likewise rectangular in cross-section, as shown in FIGURE 6.

Figure 8:
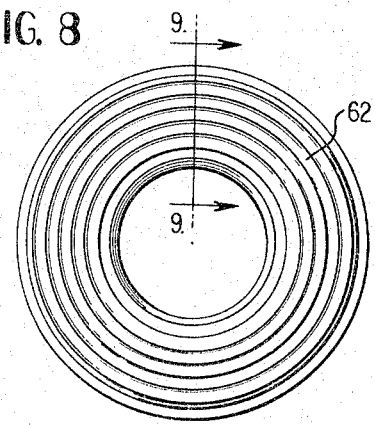
FIGURE 8 is a plan view of the improved sealing gasket shown in FIGURE 7, as it appears when not compressed.
Figure 9:
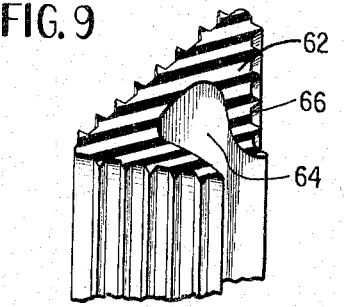
FIGURE 9 is a vertical cross-sectional view taken on line 9—9 of FIGURE 8.

In FIGURE 7, the joint 58 has an annular recess 60 which is generally right triangular in cross-sectional shape with the cross-sectional shape of the sealing gasket 62 being congruent thereto as shown in FIGURES 8 and 9. It should be also noted that the split 64 and curled tail 66 are formed at the ninety degree angle.

Figure 10:
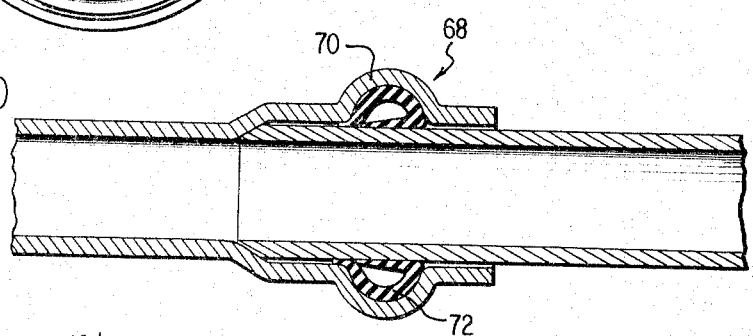
FIGURE 10 is a vertical cross-sectional view of the improved pipe joint, similar to FIGURES 1, 4 and 7 and utilizing a sealing gasket having a still further modified cross-sectional shape.
Figure 11:
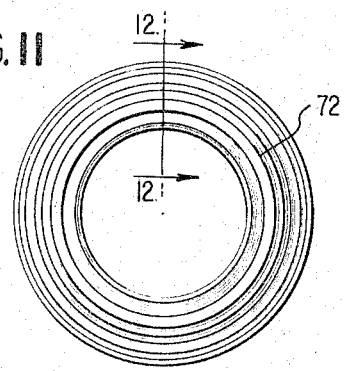
FIGURE 11 is a plan view of the improved sealing gasket shown in FIGURE 10, as it appears when not compressed.
Figure 12:
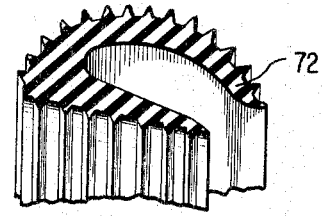
FIGURE 12 is a vertical cross-sectional view taken on line 12—12 of FIGURE 11.

In FIGURE 10, the joint 68 has an annular recess 70 which is generally semi-circular cross-sectional shape and the sealing gasket 72 has a congruent cross-sectional shape, as seen in FIGURES 11 and 12.

As mentioned hereinabove the sealing gaskets 34, 56, 62 and 72, including the V shaped ridges, are molded in one-piece and are made of either composition rubber or neoprene. Also the hubs defining the recesses 30, 54, 60 and 70 may be formed on the ends of the pipe in any manner desired; however, it has been found that these hubs may be easily formed by heating the ends of the pipes and then expanding the ends by the use of a mandrel.

The pipes 12 and 14 are preferably made of polyvinyl chloride (PVC) plastic, and the distance that pipe 12 overlaps pipe 14 should be approximately equal to between two and one half and three times the outer diameter of the pipe 14 so as to provide for the linear expansion and contraction of the pipes. However, regardless of the material used to make the pipes, as long as the amount of the overlap is greater than the linear expansion or contraction ratio, the joint 10 will automatically, and without leakage, compensate for expansion and contraction of the pipes 12 and 14.

Also, as mentioned above, the joints 10, 52, 58 and 68 are assembled by placing the sealing gasket within the recess formed in the hub of the outer pipe and then forcing the inner pipe into the hub until the leading edge of the inner pipe contacts the connecting portion of the hub. The clearance between the outer diameter of the inner pipe and the inner diameter of the hub is extremely small and lubrication will most always be needed to assist in telescoping the pipes together.

When the joint is thus assembled, the curled tip and base portion, together with the compression of the gasket within the recess due to the V shaped ridges, prevents leakage during low or no pressure operation. Moreover, as the pressure of the fluid flowing in the pipes is increased, this pressurized fluid is transmitted to the hollow center of the gasket thereby causing the gasket to expand and substantially increase its sealing effectiveness.

From the foregoing, it is apparent that this invention provides a novel pipe joint, particularly adapted for PVC pipes, and incorporates therein a unique sealing gasket which effectively prevents leakage not only during high pressure operations, but also during low or no pressure operations.

This novel joint is strong, readily adaptable to various different pipe sizes and completely obviates the necessity of threading the ends of the PVC pipes or using a solvent cement to obtain a satisfactory PVC pipe joint. This pipe joint may be easily and quickly assembled and reduces maintenance time in that if leaks do occur, only the sealing gasket need be replaced; as opposed to the case with present PVC joints where the entire joint must be cut out and replaced.

Furthermore, the sealing gasket utilized in this improved joint is itself unique in that it uses a hollow center portion, a curled tip, a biased base portion and a plurality of V shaped ridges to seal the joint completely during all pressure applications.

Thus, in summary, through a novel combination of features the improved pipe joint and sealing gasket provide numerous advantages not found in prior pipe joints and sealing gaskets, and solve a long-standing problem in the art.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

In order to facilitate precise definition of the invention in the claims, the following language will be used to refer to the various portions of the annular sealing gaskets:

(a) Radially inner or outer portions are those portions which extend generally circumferentially around the pipe, inner and outer referring to the relative distance from the longitudinal axis of the joint. Thus, portion 48 in FIGURE 1 is a radially inner portion and portion 36 in FIGURE 1 is a radially outer portion.

(b) End refers to portions of the gaskets which extend in a direction generally normal to the longitudinal axis of the joint.

(c) Cavity surfaces are those surfaces of the body of the gasket which actually define the C-shaped cavity, or extensions of such surfaces.

What is claimed and desired to be secured by United States Letters Patent is:

1. A pipe joint comprising a first pipe having an enlarged hub portion at its end, a second pipe telescopically received in the hub portion of the first pipe, the hub portion having a circumferential recess for receiving an annular sealing gasket, and a gasket having a resilient ring-like body substantially completely filling the recess and including a hollow annular central cavity, the walls of which are formed by the gasket body, the end of the radially inner wall of the cavity nearest the end of the second pipe being removed to form an annular opening permitting access to the central cavity and defining thereby a C shaped cross-section for the gasket, the radially outer wall of the central cavity being extended radially inward to form a flexible curving tip portion wedged tightly between the hub portion and the second pipe with its cavity surface in contact with the second pipe, the unconfined inside diameter of the gasket being less than the outside diameter of the second pipe, whereby the radially inner wall of the cavity is displaced when the joint is assembled, the radially inward reaction force caused by such displacement serving to tightly engage the gasket and the second pipe to prevent the flow of fluid therebetween, the annular opening serving to permit the entry of high pressure fluid into the central cavity to expand the sealing gasket thereby increasing its sealing effectiveness, the curved tip portion being tightly engaged between the hub and the second pipe to enhance the sealing properties of the gasket when the internal pressure is below that on the outside of the pipe.

2. The pipe joint as set forth in claim 1 where the dimensions of the cavity are comparable to the wall thickness of the gasket body.

3. A pipe joint as set forth in claim 2 where the cut in the radially inner wall of the cavity and the cavity surface of the flexible tip portion define the annular opening permitting access to the central cavity.

4. The pipe joint as set forth in claim 3 including a plurality of V-shaped ridges integrally formed on the outer surface of the gasket body, the ridges being compressed when the gasket is in position within the joint to increase the effectiveness of the seal.

References Cited by the Examiner

UNITED STATES PATENTS

| 1,924,020 | 8/1933 | Bihet | 285—345 |
| 2,245,153 | 6/1941 | McWane | 285—110 |
| 2,259,453 | 10/1941 | Beyer | 285—111 |
| 2,294,142 | 8/1942 | Turner | 285—383 |
| 3,199,831 | 8/1965 | Sully | 277—205 |

FOREIGN PATENTS

| 550,676 | 9/1956 | Belgium. |
| 1,361,209 | 4/1964 | France. |
| 432,578 | 3/1948 | Italy. |

CARL W. TOMLIN, *Primary Examiner.*

R. GIANGIORGI, R. BERKLEY, *Assistant Examiners.*